(12) United States Patent
Carpenter et al.

(10) Patent No.: US 7,745,567 B2
(45) Date of Patent: Jun. 29, 2010

(54) PROCESS FOR STRIPPING POLYMER DISPERSIONS

(75) Inventors: James Kent Carpenter, Lambertville, NJ (US); Adam Loyack, Feasterville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 14 days.

(21) Appl. No.: 11/978,325

(22) Filed: Oct. 29, 2007

(65) Prior Publication Data

US 2008/0103289 A1  May 1, 2008

Related U.S. Application Data

(60) Provisional application No. 60/855,350, filed on Oct. 30, 2006.

(51) Int. Cl.
*C08F 6/00* (2006.01)
*C08C 2/06* (2006.01)

(52) U.S. Cl. ............................ 528/500; 95/254; 95/263; 165/154; 165/166; 165/181; 528/480; 528/481; 528/501; 528/502 R

(58) Field of Classification Search .................. 528/480, 528/481, 501, 502 R, 500; 95/254, 263; 165/154, 166, 181
See application file for complete search history.

(56) References Cited

U.S. PATENT DOCUMENTS

| 2,467,769 | A | | 4/1949 | Morrow et al. |
| 3,467,617 | A | | 9/1969 | Weichselbaum et al. |
| 3,469,617 | A | | 9/1969 | Palmason |
| 6,353,087 | B1 | * | 3/2002 | Chang-Mateu et al. ...... 528/481 |
| 7,304,124 | B2 | * | 12/2007 | Fujino et al. ............ 528/502 R |
| 2005/0176925 | A1 | * | 8/2005 | Fujino et al. ............ 528/502 R |

* cited by examiner

*Primary Examiner*—Terressa M Boykin
(74) *Attorney, Agent, or Firm*—Tifani M. Cottingham

(57) ABSTRACT

A process for continuously stripping a polymer dispersion comprising a heat exchanger with minimal internal obstructions for the stripper. The process is particularly adapted to dispersions that are heat and shear sensitive. The process is able to extract hydrophobic VOC's more efficiently than a single, jacketed tube design.

7 Claims, 1 Drawing Sheet

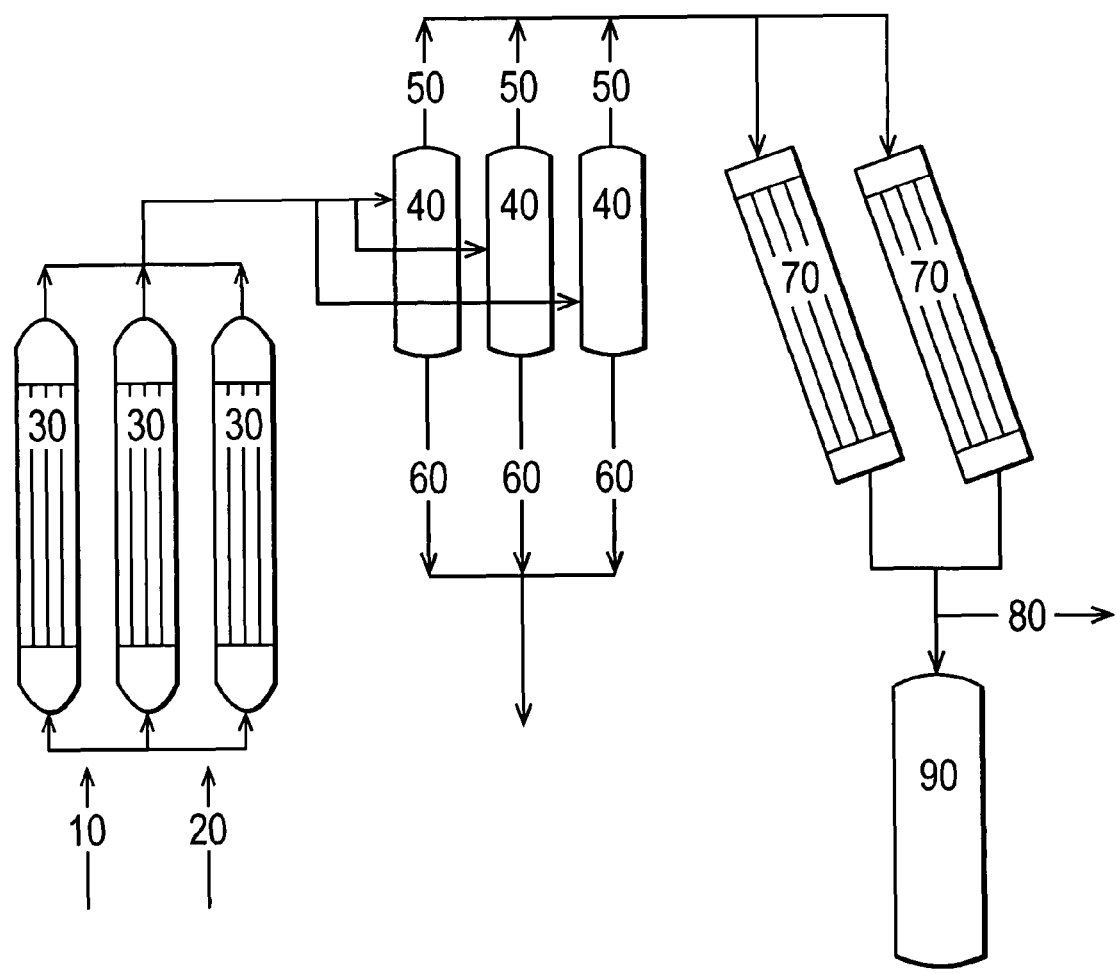

PROCESS FOR STRIPPING POLYMER DISPERSIONS

This patent application claims the benefit of the earlier filing date of prior filed provisional application Ser. No. 60/855,350 filed on Oct. 30, 2006 under 37 CFR 1.78(a)(4).

The present invention relates to a process for stripping polymer dispersions or as used herein, "dispersions", and in particular for stripping of heat and shear sensitive dispersions. As used herein a heat sensitive dispersion is defined as a dispersion which can be destabilized by raising the temperature above 50° C. and a shear sensitive dispersion is defined as a dispersion which can be destabilized by shearing above 1000 l/s.

Polymers are made by various processes, including water based solution, suspension, and emulsion polymerization. As used herein, by polymer dispersion is meant a polymer made by emulsion, miniemulsion, or suspension polymerization. The polymerization process is carried out by supplying to a polymerization reactor, such as a stirred batch reactor, the materials used in polymerization. Such materials include a polymerization medium, surface active ingredients, monomer and/or polymer seed, and any desired additives.

One problem in making polymers is that the resulting polymer dispersion contains volatile organic compounds ("VOCs"). VOCs may be any organic compound with a normal boiling point less than 250° C., such as residual monomers, impurities from monomers, reaction by-products, solvents from surfactants, monomers, or other raw materials. The problem is that VOCs tend to have strong odors, and people can smell VOCs at extremely low levels, such as in the part per million range. Furthermore, some VOCs are toxic.

Although, stripping VOCs from the polymer dispersions solves the problems associated with VOCs, there are difficulties associated with the stripping process itself. Stripping of dispersions is more complicated than stripping of ordinary solutions for two reasons. First, the surfactant species in the dispersion causes the material to foam. Second, stripping can destabilize the dispersion causing the polymer to foul the equipment and produce polymer agglomerates within the dispersion which are called gels. Stripping of dispersions is normally done under vacuum and lower temperatures to minimize the equipment fouling and gel formation. The vacuum makes the foaming worse.

The art has recognized these problems with dispersions and has attempted to solve it by continuously steam stripping VOCs from a water-based polymer foaming dispersion by co-currently contacting the dispersion with steam in a jacked tube or pipe. Co-current contacting is where the two contacting streams flow in the same direction within the stripper. For example, in U.S. Pat. No. 2,467,769 a single jacketed tube used to heat the dispersion and steam during the stripping process is disclosed. Because the heating rate across a metal surface is proportional to the temperature difference across the surface and the contact area, this design is limiting on a larger plant scale for temperature sensitive materials. When using a single tube, the ratio of surface area to volume drops when scaled up geometrically, requiring a greater temperature difference across the heating surface in order to maintain a proportionally higher heating rate on the plant scale. The greater temperature difference produces a higher stripper jacket temperature which causes fouling and build up of dispersion on the internal surface of the equipment, along with gels within the dispersion. This is particularly true in products with lower glass transition temperatures (Tgs), less than 50° C. Alternatively, if the tube is not scaled geometrically and is made longer to increase the surface area, this makes the design excessively large.

Another attempt at solving problems with dispersion stripping is found in U.S. Pat. No. 3,469,617. U.S. Pat. No. 3,467,617 discloses the use of a plate and frame heat exchanger for use as a continuous steam stripping device. The plate and frame design has more surface area to volume than a jacketed pipe and can maintain a low temperature difference during heating of the dispersion. Over time, polymer build up occurs in all designs and the polymer needs to be removed. This design is more difficult to clean. To clean, the plates are taken apart, cleaned, and restacked in the frame. In the case of acrylic polymer dispersions, hot caustic can be pumped through the heat exchanger to acidify the esters, make the polymer more water soluble, and flush the material out. For non-acrylic polymers the caustic method does not work as well.

It has been presently discovered that these problems of agglomeration and fouling associated with continuous steam stripping of dispersions, can be solved by using a heat exchanger with minimal internal obstructions, such as a single-pass shell and tube heat exchanger in the stripping process. The advantage of high surface area to volume can be maintained like in the plate and frame heat exchanger design and the temperature difference between the shell and process side can be kept small, around a desirable 5° C. A small temperature differential is important because it maintains a low temperature relative to the Tg of the material along the walls of the stripper. This allows stripping of the dispersions in the plant at flow rates much larger than the lab scale, while maintaining the same favorable temperature difference across the jacket in the plant as is achieved in the lab, and, thereby, minimizing fouling of the equipment and gel formation.

In the present invention, there is provided a process for continuously stripping polymer dispersions with volatile substances comprising:

providing a polymer dispersion and steam wherein the dispersion comprises aqueous emulsion polymer and volatile organic compounds;

feeding the polymer dispersion and steam into a stripper;

removing at least a portion of the volatile organic compounds from the dispersion;

transferring the portion of the volatile organic compounds to the steam; and separating the steam from the aqueous emulsion polymer in a separator vessel wherein the stripper:

(a) has a ratio of surface area to volume of at least 10:1 l/m; and (b) is comprised of one or more heat exchangers in parallel or series wherein the heat exchanger is a shell and tube or spiral heat exchanger.

BRIEF DESCRIPTION OF THE DRAWINGS

FIG. 1 is a process schematic depicting a steam stripping process according to the present invention.

DETAILS

Reference Numerals

10 dispersion feed
20 steam feed
30 stripper
40 separator 50 first separator outlet
60 second separator outlet
70 condenser
80 vacuum
90 receiver vessel

DETAILED DESCRIPTION OF THE INVENTION

A process schematic is shown in FIG. 1. Although FIG. 1 depicts one design of the steam stripping process, the figure is not intended to be limiting. One of ordinary skill in the art would recognize that this design may be modified by using functionally similar equipment and multiple arrangements with the exception of modification to the type of stripper. Additionally, the quantity of process equipment is not meant to be limiting. For instance, there may be a single stripper (30) or multiple strippers (30), or there may be a single condenser (70) or multiple condensers (70). The same is the case for the separator (40) as well. As depicted in FIG. 1, a solution comprising polymer dispersion and volatile organic compounds is fed (10) to the one or more stripper(s) (30). The volatiles can be either hydrophobic and found primarily in the polymer phase of the dispersion, or they can be hydrophilic and found primarily in the aqueous phase of the dispersion. Steam is also fed (20) to the one or more stripper(s) (30). The polymer dispersion (10) and steam (20) may be contacted before the stripper(s) or in the stripper(s). They may be fed to the one or more strippers together or separately. The resulting polymer dispersion and steam mixture passes through the stripper (30) into the one or more separator(s) (40). Here the polymer dispersion separates from the steam. The steam exits the separator (40) through a first separator outlet (50) and enters one or more condenser(s) (70) where volatile organic compounds are condensed and collected in a receiver vessel (90). The polymer dispersion exits the separator(s) through a second separator outlet (60) and the stripped dispersion is collected.

In one embodiment steam and a polymer dispersion, are co-fed into the bottom of a stripper. As used herein, co-fed means that the steam and the polymer dispersion enter the stripper as one two-phase liquid-gas stream or two separate gas and liquid streams. As used herein, what is meant by a stripper is a heat exchanger. Suitable heat exchangers of the present invention include but are not limited to, single pass shell and tube heat exchangers, multiple pass shell and tube heat exchangers, and spiral heat exchangers. In one embodiment of the present invention, the stripper is a single-pass shell and tube heat exchanger. The single pass design is advantageous because it uses a straight tube which is more easily cleaned by a water spray. Use of this equipment potentially avoids costly, labor intensive disassembly steps and the use of caustic base with its associated costs and safety hazards.

There may be a single tube or multiple tubes in the shell of the stripper. The diameter and number of tubes in the stripper is set so that the velocity of the dispersion and steam mixture within the tubes is maintained at greater than or equal to 30 m/s. This velocity rate suppresses the foam by shearing the dispersion and hastens VOC removal.

Surface area to volume is an important feature in the present invention. Suitable surface area to volume ratios are greater than or equal to 10 l/m. All ratios are inclusive and combinable. The higher surface area to volume ratio of the shell and tube design can provide enough heat transfer to concentrate the polymer emulsion solids of the dispersion. In addition, this design increases the removal of undesirable and difficult to remove hydrophobic VOCs as compared to the processes in the art which use a single jacketed tube.

With the additional surface area provided by the stripper, only a moderate amount of heating is favorable to maintain or increase the solids level. By moderate 1 to 5° C. is meant. Moderate heating is desirable for heat sensitive materials that tend to foul or form gels at higher temperatures.

After passing through the stripper, the polymer dispersion and steam enters the separator vessel. The VOCs partition between the polymer dispersion and the steam. The hydrophobic VOCs, such as dibutyl ether and butyl propionate, tend to strip more slowly than the hydrophilic VOCs, such as butanol and methanol. The increased surface area and more intense shearing of the polymer dispersion in the stripper increases the mass transfer rate of the hydrophobic VOCs. The polymer dispersion, comprising hyprophobic VOCs is separated and drops to the bottom of the separator by gravity and the steam is carried out the top of the separator with other present non-condensable gases. The polymer dispersion is pumped out of the separator vessel. The separator vessel comprises a jacket, coil, or external heat exchanger for cooling to reduce foaming of the dispersion during the separation of the dispersion and water vapor.

The steam and VOCs are then condensed in a heat exchanger or condenser and the condensate is collected in a receiver tank. Suitable heat exchangers or condensers for the current invention are known by those of ordinary skill in the art.

Furthermore, the process is conducted under vacuum. Maintaining a vacuum environment is essential to prevent fouling of the dispersion. The vacuum may be placed after the condenser, before or on the receiver tank. The pressure in the vacuum ranges from upper limits of 40,000 and 27,000 Pa to lower limits of 100 and 2700 Pa. These pressure ranges are inclusive and combinable.

The process temperature is set by the vacuum pressure of the system. Maximum temperature ranges from an upper limit of 100° C. to a lower limit of 20° C. When the polymer dispersion is an acrylic dispersion, the preferred temperature ranges from an upper limit of 60° C. to a lower limit of 30° C. The stripper shell temperature is set higher than the temperature in the stripper to compensate for heat losses which ensures the flow of steam in and out of the process is the same, and, thereby, maintain the solids level in the dispersion. For heat sensitive materials heat should be applied to the exterior of the tubes within the stripper such that the stripper jacket temperature is 1 to 5° C. higher than the stripper tube temperature. As used herein, by stripper jacket temperature is meant the temperature as measured in the space between the interior of the stripper and the exterior of the interior stripper tube or tubes.

EXAMPLES

Test Method

Solids Measurement: 2.5 g of polymer dispersion is weighed on an aluminum tray using a standard laboratory scale. The sample is placed in an oven to evaporate the water. The solids level is calculated using the before and after weights. The oven temperature is set at 150° C. and the samples are heated for 20 minutes.

VOC Measurement: The VOCs are measured on a HP 5890 Gas Chromatograph.

Run conditions are:

Temperature Program:

| INITIAL TEMP (° C.) | TIME (min) | RATE (° C./min) | FINAL TEMP (° C.) | HOLD (min) |
|---|---|---|---|---|
| 40 | 5 | 12 | 200 | 15 |

Sample Preparation:

| | |
|---|---|
| Internal Standard | 5,000 ppm Ethylene Glycol Diethyl Ether (EGDEE) |
| Dilution Factor | 1:1 |
| Injection Volume | 2 ml |

EGDEE is readily obtainable from Sigma-Aldrich Chemicals.

Calibration Information:

| | |
|---|---|
| Calibration Type | Internal Standard Solution (ISTD) |
| Levels of Calibration | 8 |
| Calibration Range | 5-10,000 ppm |
| Calibration Curve | Weighted Linear Regression |

Example 1

Comparison of Three Process Configurations

The three process configurations are:
a. Stripping through 54" long, 1" diameter tube
b. Stripping through ten ⅜"-tubes of a 36" long single pass shell and tube heat exchanger w/the 10 tubes centered in the middle of the heat exchanger shell
c. Stripping through ten ⅜"-tubes of a 36" long single pass shell and tube heat exchanger w/5 tubes centered in the heat exchanger shell and 5 off-centered.

In each process configuration, the dispersion flow rate=740 g/min; steam flow rate=150 g/min; stripper temperature=47.9° C.; stripper jacket temperature=48.3° C.; and steam residence time=1.8 seconds or 0.03 minutes. The dispersion and steam velocity within the stripper for configuration "a" is 82 m/s. The dispersion and steam velocity for configurations "b" and "c" is 59 m/s. The solids results are shown in Table 1.

TABLE 1

Solids Results

| | Initial Solids (%) | Final Solids (%) | Solids Increase (%) |
|---|---|---|---|
| a. | 49.4% | 49.7% | +0.3% |
| b. | 49.0% | 51.1% | +2.1% |
| c. | 49.6% | 51.2% | +1.5% |

As shown in Table 1, with the same stripper and jacket temperatures, additional surface area of the shell and tube heat exchanger (b and c configurations) increases the solids level more than a single tube (a).

Example 2

Comparison of Two Process Configurations

The two process configurations are:
a. Stripping through 54" long, 2" diameter tube
b. Stripping through forty ⅜"-tubes of a 36" single pass shell and tube heat exchanger w/40 tubes centered in the middle of the heat exchanger jacket In each process, dispersion flow rate=1190 g/min; steam flow rate=150 g/min; stripper temperature=42.5° C.; and steam residence time=0.025 min. The dispersion and steam velocity for configuration "a" is 160 m/s and for configuration "b" is 120 m/s. The VOC results are shown in Table 2.

TABLE 2

VOC Results

| | Dibutyl Ether Initial (ppm) | Dibutyl Ether Final (ppm) | % Dibutyl Ether Remaining (%) | Difference b/n configurations |
|---|---|---|---|---|
| a. | 274 | 225 | 83.2% | |
| b. | 270 | 170 | 63.0% | 20.2% |
| | Butyl Propionate (ppm) | Butyl Propionate Final (ppm) | % Butyl Propionate Remaining (%) | Difference b/n configurations |
| a. | 116 | 84 | 72.4% | |
| b. | 102 | 61 | 59.8% | 12.6% |
| | Butanol (ppm) | Butanol Final (ppm) | % Butanol Remaining (%) | Difference b/n configurations |
| a. | 254 | 86 | 34.9% | |
| b. | 177 | 67 | 37.8% | <0% |
| | Methanol (ppm) | Methanol Final (ppm) | % Methanol Remaining (%) | Difference b/n configurations |
| a. | 176 | 68 | 38.4% | |
| b. | 149 | 57 | 38.2% | 0.2% |

*b/n—between

Example 2 is run at a larger scale than Example 1. The more difficult to remove, hydrophobic VOCs (Dibutyl Ether and Butyl Propionate) were extracted to a lower VOC percentages in the heat exchanger/stripper. The hydrophilic VOCs (Butanol and Methanol) are extracted at the same percentage of removal in both configurations. The smaller diameter of the heat exchanger tubes creates more surface area and greater shear which enhances the separation of the more difficult to remove, hydrophobic VOCs.

We claim:

1. A process for continuously stripping polymer dispersions with volatile substances comprising:
   providing a polymer dispersion and steam wherein the dispersion comprises aqueous emulsion polymer and volatile organic compounds;
   feeding the polymer dispersion and steam into a stripper;
   removing at least a portion of the volatile organic compounds from the dispersion;
   transferring the portion of the volatile organic compounds to the steam; and
   separating the steam from the aqueous emulsion polymer in a separator vessel
   wherein the stripper:
   (a) has a ratio of surface area to volume of at least 10:1 l/m;
   (b) further comprises a vacuum wherein the pressure in the vacuum ranges from 100 to 40,000 Pa; and
   (c) is comprised of one or more heat exchangers wherein the heat exchanger is a shell and tube heat exchanger or a spiral heat exchanger.

2. The process of claim 1 wherein the stripper is a single pass shell and tube heat exchanger.

3. The process of claim 1 or 2 wherein the velocity of the polymer dispersion and steam is at least 30 m/s within the stripper.

4. The process of claim 1 or 2 further comprising:

applying heat to the exterior of the tubes within the stripper.

5. The process of claim 1 wherein the polymer dispersion is fed at a temperature greater than the water vapor temperature for the vacuum.

6. The process of claim 1 wherein the pressure in the vacuum is between 2700 and 27,000 Pa.

7. The process of claim 1 wherein the separator vessel comprises a jacket, coil, or external heat exchanger.

* * * * *